United States Patent [19]
Kabaya et al.

[11] Patent Number: 5,305,322
[45] Date of Patent: Apr. 19, 1994

[54] PHASE ALIGNMENT CIRCUIT FOR STUFFED-SYNCHRONIZED TDM TRANSMISSION SYSTEM WITH CROSS-CONNECT FUNCTION

[75] Inventors: Eiichi Kabaya; Kenichi Kurokawa, both of Tokyo, Japan

[73] Assignee: NEC Corporation, Tokyo, Japan

[21] Appl. No.: 3,832

[22] Filed: Jan. 8, 1993

Related U.S. Application Data

[63] Continuation of Ser. No. 542,568, Jun. 25, 1990, abandoned.

Foreign Application Priority Data

Jun. 23, 1989 [JP] Japan .................................. 1-161506

[51] Int. Cl.[5] .............................................. H04J 3/06
[52] U.S. Cl. ...................... 370/102; 370/100.1; 375/118
[58] Field of Search ............ 370/102, 105.4, 105.1, 370/105.2, 105.3, 100.1, 108; 375/118, 111, 107, 106, 112

[56] References Cited

U.S. PATENT DOCUMENTS

| | | | |
|---|---|---|---|
| 4,132,862 | 1/1979 | Ferret et al. | 370/102 |
| 4,513,427 | 4/1985 | Borriello et al. | 370/108 |
| 4,543,652 | 9/1985 | Amada et al. | 370/105.1 |
| 4,805,195 | 2/1989 | Keegan | 370/108 |
| 4,884,268 | 11/1989 | Goto | 370/102 |
| 4,920,547 | 4/1990 | Murakami | 370/102 |
| 4,935,921 | 6/1990 | Ishizaki et al. | 370/102 |
| 4,959,830 | 9/1990 | Petersen | 370/108 |
| 4,977,582 | 12/1990 | Nichols et al. | 370/108 |
| 5,030,951 | 7/1991 | Eda et al. | 370/102 |

FOREIGN PATENT DOCUMENTS 238332  9/1989  Japan .................................. 370/102

Primary Examiner—Douglas W. Olms
Assistant Examiner—Dang Ton
Attorney, Agent, or Firm—Sughrue, Mion, Zinn, Macpeak & Seas

[57] ABSTRACT

In a stuff-synchronized time division multiplex (TDM) transmission system, an incoming TDM signal is delayed so that a plurality of TDM frame sequences are successively delayed by one time slot and appear at the inputs of a data selector. A control circuit is provided for deriving a channel-by-channel selection signal from stuff specification bits contained in the incoming TDM signal. The data selector is responsive to the selection signal to select a channel in one of the TDM frame sequences and delivers the selected channel as a TDM output signal to a time division switch, or cross-connect in which it is decomposed into channels for switching to a desired route.

2 Claims, 3 Drawing Sheets

CONTROL CIRCUIT 10

PHASE ALIGNMENT CIRCUIT FOR STUFFED-SYNCHRONIZED TDM TRANSMISSION SYSTEM WITH CROSS-CONNECT FUNCTION

This is a continuation of application Ser. No. 07/542,568 filed Jun. 25, 1990, now abandoned.

BACKGROUND OF THE INVENTION

The present invention relates generally to a time division multiplexed (TDM) transmission system, and more specifically to a phase alignment circuit for a stuff-synchronized TDM transmission system having a cross-connect function.

Pulse stuffing is a well known technique for synchronizing asynchronous lower-level dignal signals before multiplexing them into a higher-level outgoing multiplex signal. This is done by storing the input data streams into a memory and reading it at a nominal bit rate so that all input streams have equal bit rates. According to "positive-zero-negative" stuffing technique, the outgoing data stream has a special time slot known as V-slot which initially contains dummy bits/bytes assigned respectively to the lower-level incoming signals. If the bit rate of a given incoming signal is lower than the nominal rate, the dummy bit of the given incoming signal in the V-slot of the outgoing signal is replaced with a stuff bit/byte (positive stuffing), and if the former is higher than the latter, the dummy bit/byte of the incoming signal is removed from the V-slot (negative stuffing). If the incoming bit rate is equal to the nominal rate, zero stuffing is effected by simply leaving the associated dummy bit/byte in the V slot. The higher-level multiplex signal further contains stuffing specification bits which indicate whether each bit/byte in the V slot is a positive or negative stuff bit/byte, or a dummy bit/byte.

There is often a need to decompose a higher-level multiplex signal into channel component signals for switching to a desired route by interchanging their time slots using a cross-connect, or time division switch. However, as multiplex signals pass through several TDM hierarchical stages during transmission, new stuff bits/byte may be inserted. This often results in the individual channels developing timing discrepancies from a reference phase. To permit the time division switch to properly effect time slot interchange, the phase differences of the individual channels of a frame sequence need to be aligned to the reference phase. As illustrated in FIG. 1, it is the current practice to decompose a frame into individual channels by a TDM demultiplexer 1 for coupling to memories or timing adjustment circuits 2-1~2-n and extract stuffing specification bits (SSB) from the frame with a detector 3. Timing adjustment circuits 2 perform timing adjustments on the decomposed channels in accordance with timing information obtained by the extracted stuffing specification bits. The outputs of the timing adjustment circuits 2 are multiplexed again by a TDM multiplexer 4 and supplied to the time division switch where it is further decomposed into channels to be switched to a desired route. Since timing adjustment circuits 2 must be provided in a one-to-one correspondence with the channels of a frame, the total cost and size of the timing adjustment system increase in proportion to the channels multiplexed in the frame.

SUMMARY OF THE INVENTION

It is therefore an object of the present invention to provide a small-sized, economical phase alignment circuit for a stuff-synchronized TDM transmission system having a cross-connect function.

According to the present invention, there is provided a phase alignment circuit for a stuff-synchronized time division multiplex (TDM) transmission system which carries a TDM signal having time slots each containing a plurality of channels. Stuff bits/byte are inserted in a specified time slot of the TDM signal. The TDM signal also contains stuff specification bits specifying types of the stuff bits/byte. In the phase alignment circuit, the TDM signal is delayed so that a plurality of TDM frame sequences are successively delayed by one time slot at the inputs of a data selector. A control circuit is provided for deriving a channel-by-channel selection signal from the stuff specification bits. The data selector is responsive to the selection signal to select a channel in one of the TDM frame sequences and deliver the selected channel as a TDM output signal to a time division switch in which it is decomposed into channels and switched to a desired route.

BRIEF DESCRIPTION OF THE DRAWINGS

The present invention will be described in further detail with reference to the accompanying drawings, in which.

DETAILED DESCRIPTION

Figure 2:
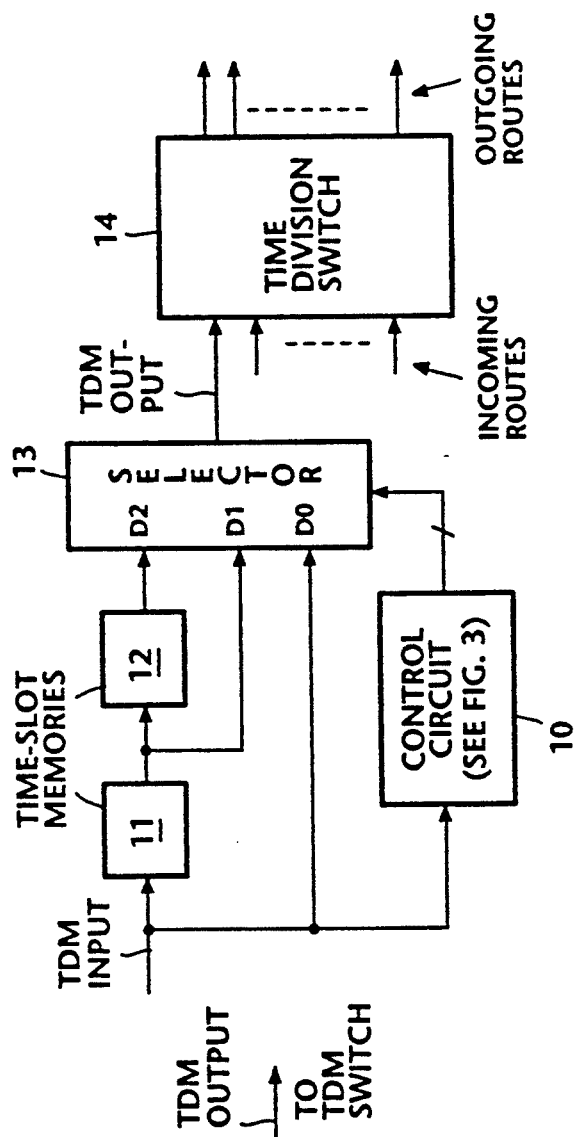
FIG. 2 is a block diagram of a phase alignment circuit of this invention.
Figure 1:
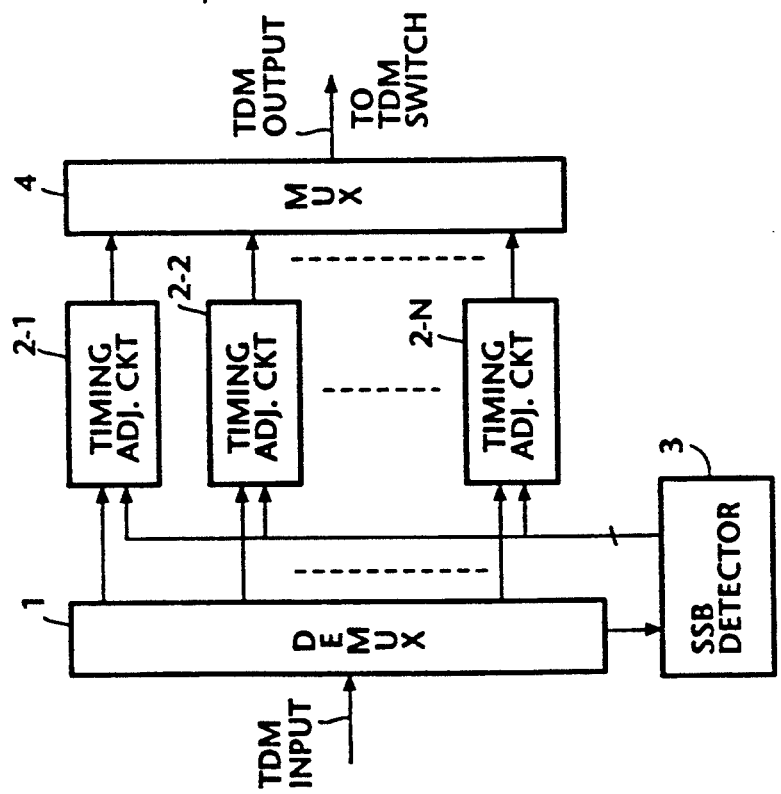
FIG. 1 is a block diagram of a prior art phase alignment system.

A phase alignment circuit of the present invention is shown in FIG. 2 as comprising a control circuit 1 0 to which a stuff-synchronized TDM input signal is supplied to detect stuff specification bits contained in the incoming TDM signal. A channel-by-channel data selection signal is generated by control circuit 10 and supplied to a data selector 13. The TDM input is also applied to a tapped-delay line having a series of time-slot memories or delays 11 and 12, the first, second and third taps of the delay line being respectively coupled to a first, second and third input terminals D0, D1 and D2 of data selector 13. Therefore, three sequences of the incoming TDM frame are successively delayed by one time slot at the input terminals of selector 13.

One of the channel signals at the input terminals D0, D1 and D2 is selected by data selector 13 in accordance with the output of control circuit 10 so that the channels in each time slot are aligned to a reference phase. The TDM output of data selector 13 is fed to time division switch, or cross-connect 14 to which other TDM signals from different incoming routes are also applied. The phase-aligned TDM signal of each incoming route is decomposed by the switch 14 into channel signals for switching to a desired outgoing route.

Figure 3:
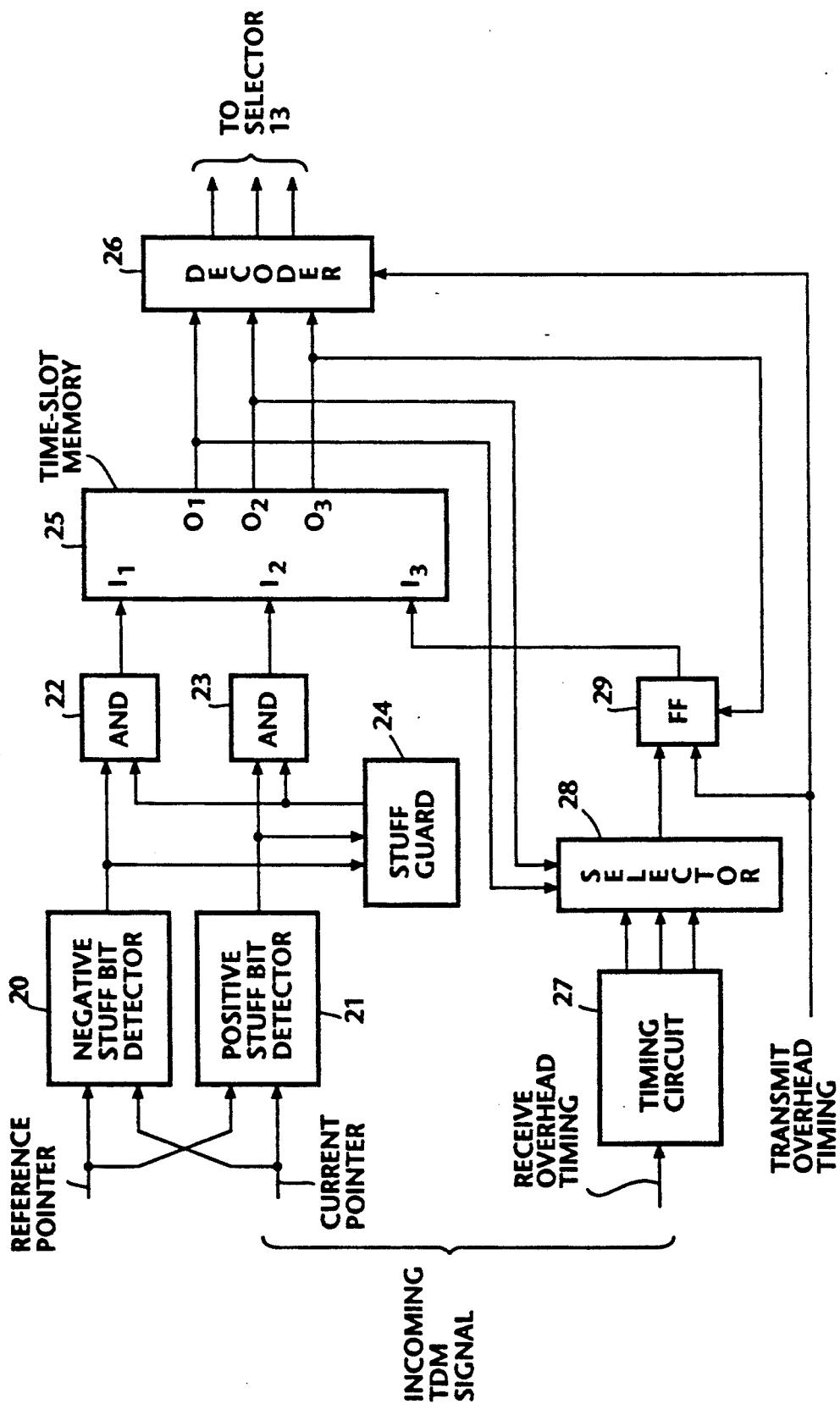
FIG. 3 is a block diagram of the control circuit of FIG. 2.

Details of the control circuit 10 are shown in FIG. 3. The incoming TDM signal contains in its frame sequence an overhead in which pointers indicating the beginning of various types of data are inserted. Control circuit 10 includes a negative stuff bit detector 20 and a positive stuff bit detector 21. A 10-bit current pointer contained in the TDM input is extracted from it and supplied to both detectors 20 and 21 in which it is compared with a 10-bit reference pointer to detect whether the bit in each channel of a following V-slot is a positive or negative stuff bit, or an information bit (zero stuff). The outputs of detectors 20 and 21 are respectively fed to AND gates 22 and 23 as well as to a stuff guard circuit 24 whose function is to prevent repeated phase alignments from being effected on each channel by disabling AND gates 22 and 23. A time-slot memory 25 is provided having input terminals $I_1$, $I_2$ and $I_3$ and corresponding output terminals $O_1$, $O_2$ and $O_3$, the input terminals $I_1$ and $I_2$ being respectively connected to the outputs of AND gates 22 and 23 and the terminal $I_3$ being coupled to the output of an RS flip-flop 29. The output terminals $O_1$ to $O_3$ of memory 25 are coupled to a decoder 26, with output terminals $O_1$ and $O_2$ being further coupled to a selector 28 and output terminal $O_3$ to a clear input of flip-flop 29.

A timing circuit 27 is provided to derive from the overhead timing of the received TDM signal a plurality of timing signals respectively indicating the beginning of positive, negative and zero stuffing operations, these timing signals being supplied to selector 28. Selector 28 selects one of the timing signals from timing circuit 27 and supplies it to the set input of flip-flop 29. A transmit overhead timing signal is applied to the reset input of flip-flop 29 so that the output of flip-flop 29 indicates the beginning and end of a phase alignment operation.

With AND gates 22 and 23 being enabled, one of the outputs of negative and positive stuff bit detector 20, 21 is stored into memory 25 together with the output of flip-flop 29. Following a one-slot delay, the data stored in memory 25 are supplied to decoder 26 which translates the input signals and supplies a data selection signal to selector 13.

Figure 4:
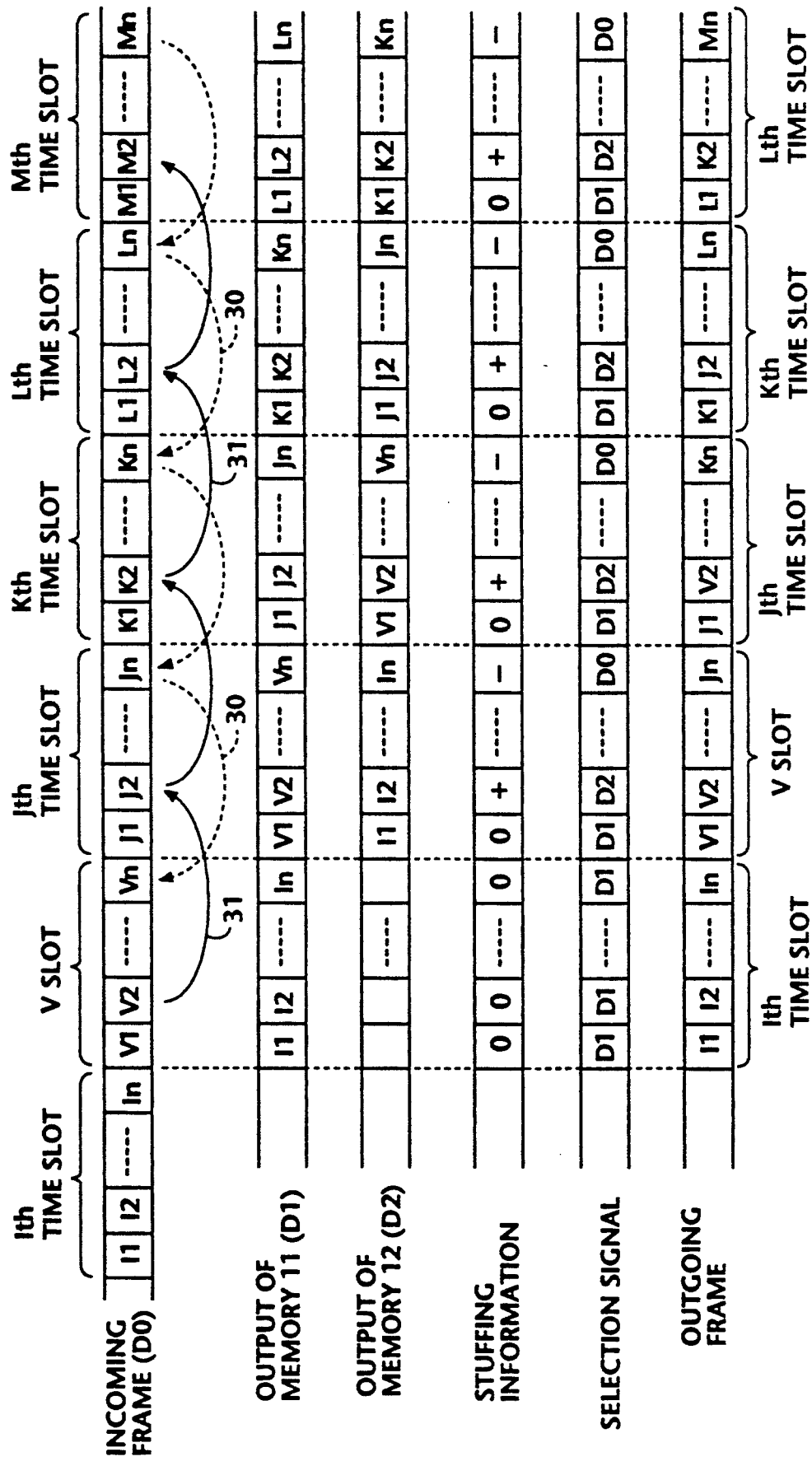
FIG. 4 is a timing diagram for describing the operation of this invention.

As shown in FIG. 4, a portion of the incoming TDM signal is shown as consisting of Ith to Mth time slots with a V-slot appearing between the Ith and Jth time slots. Each time slot contains n channels. The stuffing information is represented by a combination of binary states at the outputs of AND gates 22 and 23, and indicates whether the signals in each time slot following the V-slot are to be positively or negatively stuffed, or zero-stuffed. In FIG. 4, positive and negative stuffing are indicated respectively by signs "+" and "−", and zero stuffing is indicated by a sign "0". Selection signals corresponding to TDM sequences D0, D1 and D2 are generated respectively in response to stuff indicating signs "−", "0" and "+" to cause data selector 13 to select one of the TDM sequences D0, D1 and D2. By selecting the TDM sequence D1 in response to the zero-stuffing signal, the TDM output is delayed one time slot with respect to the incoming TDM signal. For example, in response to a negative stuffing sign "−" in the n-th channel of the incoming Kth time slot of TDM sequence D0, the bit "Kn" of this time slot is selected and appears in the n-th channel of the outgoing jth time slot. Likewise, a zero stuffing sign "0" in the first channel of the incoming Kth time slot causes the bit J1 of the Jth time slot of the TDM sequence D1 to be selected to appear in the first channel of the outgoing Jth time slot, and a positive stuffing sign "+" in the second channel of the incoming Kth time slot causes the bit V2 of the V-slot of the TDM sequence D2 to be selected to appear in the second channel of the outgoing Jth time slot.

Therefore, in each time slot of the outgoing TDM signal following the V-slot, the n-th channel is delayed one time slot with respect to the incoming signal as indicated by dotted-arrows 30, the first channel is non-delayed, and the second channel is advanced by one time slot with respect to the incoming signal as indicated by solid-line arrows 31.

The foregoing description shows only one preferred embodiment of the present invention. Various modifications are apparent to those skilled in the art without departing from the scope of the present invention which is only limited by the appended claims. Therefore, the embodiment shown and described is only illustrative, not restrictive.

What is claimed is:

1. A phase alignment circuit for a stuff-synchronized time division multiplex (TDM) transmission system, comprising:

a tapped delay line having two time slot memories for storing an incoming TDM signal having time slots each containing a plurality of channels, each channel of a predetermined time slot of the received TDM signal having a stuff bit/byte or an information bit/byte, said received TDM signal further containing stuff specification data specifying whether each bit/byte in said predetermined time slot is a positive or a negative bit/byte or an information bit/byte, said time slot memories permitting three replicas of the incoming TDM signal to be provided at successive taps of the tapped delay line;

control means for decoding the stuff specification data contained in said incoming TDM signal and generating therefrom a channel selection signal; and selector means connected to the successive taps of the tapped delay line so that positionally corresponding channels of said three replicas appear simultaneously at inputs of the selector means, said selector means selecting a channel from said positionally corresponding channels in response to said channel selection signal and generating an outgoing TDM signal therefrom.

2. A stuff-synchronized time division multiple (TDM) transmission system, comprising:

a tapped delay line having two time slot memories for storing an incoming TDM signal having time slots each containing a plurality of channels, each channel of a predetermined time slot of the received TDM signal having a stuff bit/byte or an information bit/byte, said received TDM signal further containing stuff specification data specifying whether each bit/byte in said predetermined time slot is a positive or a negative bit/byte or an information bit/byte, said time slot memories permitting three replicas of the incoming TDM signal to be provided at successive taps of the tapped delay line;

control means for decoding the stuff specification data contained in said incoming TDM signal and generating therefrom a channel selection signal;

selector means connected to the successive taps of the tapped delay line so that positionally corresponding channels of said three replicas appear simultaneously at inputs of the selector means, said selector means selecting a channel from said positionally corresponding channels in response to said channel selection signal and generating an outgoing TDM signal therefrom; and a time division switch connected to the output of said selector means for switching channels of the outgoing TDM signal to a desired route.

* * * * *

UNITED STATES PATENT AND TRADEMARK OFFICE
CERTIFICATE OF CORRECTION

PATENT NO.    : 5,305,322
DATED         : April 19, 1994
INVENTOR(S)   : Eiichi KABAYA et al.

It is certified that error appears in the above-identified patent and that said Letters Patent is hereby corrected as shown below:

Column 1, line 17, change delete "dignal".

Column 2, line 41, change "1 0" to --10--.

Signed and Sealed this

Twentieth Day of September, 1994

Attest:

BRUCE LEHMAN

Attesting Officer

Commissioner of Patents and Trademarks